United States Patent [19]

Joly et al.

[11] Patent Number: 4,603,796
[45] Date of Patent: Aug. 5, 1986

[54] CLOSING AND FILLING UNIT FOR A TANK CONTAINING A FLUID UNDER PRESSURE

[75] Inventors: Jean-Louis Joly, Bazemont; Bernard Lallemant, Verneuil, both of France

[73] Assignee: Societe Nationale Industrielle et Aerospatiale, France

[21] Appl. No.: 732,426

[22] Filed: May 9, 1985

[30] Foreign Application Priority Data

May 18, 1984 [FR] France ................. 84 07764

[51] Int. Cl.⁴ .............. B65D 83/00; F16K 31/00
[52] U.S. Cl. ...................... 222/400.7; 222/3; 222/549; 251/218; 251/291; 251/339
[58] Field of Search .......................... 222/3–4, 222/394–395, 400.7, 502–503, 505, 548–549; 251/218, 264, 291, 339; 137/599

[56] References Cited

U.S. PATENT DOCUMENTS

| | | |
|---|---|---|
| 927,798 | 7/1909 | Hoff ............................ 222/5 |
| 2,403,427 | 7/1946 | Ludeman ............... 251/264 X |
| 2,853,094 | 9/1958 | Wexler ................... 137/559 X |
| 4,384,705 | 5/1983 | Kato ....................... 251/214 |

FOREIGN PATENT DOCUMENTS 402353 11/1933 United Kingdom ............ 222/400.7

Primary Examiner—Joseph J. Rolla
Assistant Examiner—Michael S. Huppert
Attorney, Agent, or Firm—McGlew and Tuttle

[57] ABSTRACT

A closing and filling unit having a piston valve (22) whose closure member (28) is provided with axial openings. A rotatable and slidable element (32) is provided for actuating the valve. Arrangements (35, 40, 41, 33, 36) are provided for utilizing the pressure of the fluid to force the element (32) into engagement with the piston (28). The device is adapted to be detachably fixed to the body of the valve by means of a screw-threaded boss through which extends an actuating rod (37) which is rigid with a piston (36) sliding in a chamber (33).

9 Claims, 6 Drawing Figures

CLOSING AND FILLING UNIT FOR A TANK CONTAINING A FLUID UNDER PRESSURE

The present invention generally relates to the storage of fluids under pressure in tanks for a long period and is more particularly concerned with a closing and filling unit for such a tank containing fluid under pressure.

In many applications, and in particular on artificial satellites, tanks containing a fluid under pressure are used. The devices employed for filling or emptying these tanks must satisfy conditions of minimum overall size and mass, especially in the aeronautical and spatial fields.

Devices for closing tanks are already known which are adapted to permit the filling or emptying and include a piston valve comprising a hollow cylindrical body internally screw threaded in which an externally screw-threaded piston is screwed and bears forcefully against an annular seat around which is defined a chamber connected to a fluid inlet or outlet outer connector, this piston having on its outer side a polygonal opening in which is introduced the end of a key of corresponding shape whereby it is possible to open or close the valve by unscrewing or screwing the piston in the body. When the piston is moved away from its seat by unscrewing it, the chamber defined around the seat is connected to the outer connector and thus permits the filling or emptying of the tank.

These piston valves usually have only a single sealing stage formed by a pad of a suitable elastic material compressed against the seat by the screwing of the piston. These valves have two possible outlets for the fluid, one owing to the access provided for the passage of the key and the other through the inlet or outlet connector.

Further, the force required for closing and opening the valve must be maintained in opposition to the force exerted by the pressure of the fluid contained in the tank, which is disavantageous in respect of the good behaviour of the connectors and their fluidtightness.

An object of the invention is to overcome these drawbacks and to provide a device having a reinforced fluidtightness, and an overall size and a mass which are reduced to a minimum, whereby it is possible to limit the forces required when effecting the closing and opening operations and the safety can be increased in the course of these operations by rendering the ejection of the valve impossible.

The invention therefore provides a closing and filling unit for a pressurized fluid tank, said unit comprising in combination: a piston valve whose closure member is provided with axial openings, and a device for actuating said valve comprising a rotatable and slidable element and means for utilizing the pressure of said fluid contained in the tank for the filling or the emptying of the tank for the purpose of forcing said element into engagement with the piston of the valve, said device being adapted to be detachably fixed to the body of the valve.

The following description, with reference to the accompanying drawings given by way of non-limiting examples, will explain how the present invention can be carried out.

In the drawings:

FIG. 1 shows a conventional piston valve of the type employed up to the present time.

Figure 2:
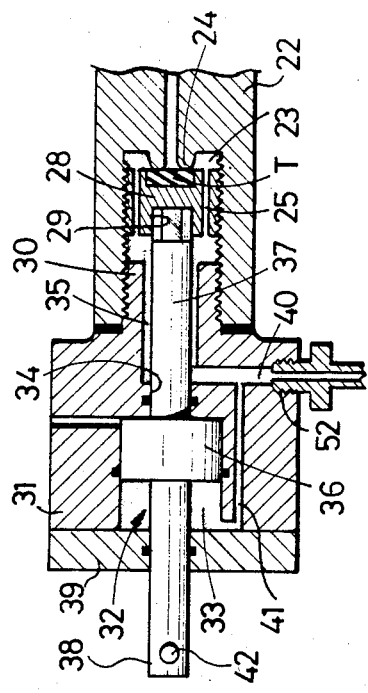
FIG. 2 is a diagrammatic side elevational and sectional view of a closing and filling unit according to the invention.
Figure 1:
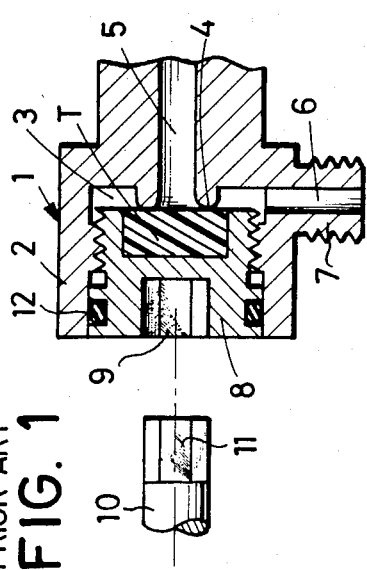
FIG. 1 is a diagrammatic side elevational and sectional view of a piston valve of the prior art.

This valve 1 comprises a hollow body 2 defining a cylindrical chamber 3 having at its inner end an annular seat 4 and a conduit 5 communicating with the tank (not shown).

An inlet or outlet conduit 6 extends radially of the body 2 and axially in a boss 7 which is externally screw threaded and constitutes a connector for the filling or emptying of the tank.

A closure piston 8 externally screw threaded includes a pad T of elastic material adapted to cooperate with the annular seat 4. At its end remote from the pad T, the piston 8 has a cavity 9 having a polygonal cross-sectional shape.

In order to open or close the valve, there is employed a key 10 mainly formed by a rod whose end 11 has a polygonal shape complementary to that of the cavity 9. A sealing element 12 is provided in a peripheral groove in the piston 8 to provide a seal between the latter and the wall of the body 2.

It will be understood that, when the end 11 of the key 10 is inserted in the cavity 9 and this key is turned in the unscrewing direction, the piston 8 gradually moves away from the seat 4 and increases the size of the chamber 3 which is filled with fluid which can escape through the conduit 6. Inversely, when the piston is in the unscrewed position spaced away from its seat 4, the boss or connector 7 can be connected to a source of fluid under pressure for the purpose of filling the tank. When the tank is full, the piston 8 is again screwed by means of the key 10 so as to bring the pad T into contact with the annular seat 4 under pressure.

Reference will now be made to FIG. 2 which is a diagrammatic longitudinal sectional view of a closing and filling unit according to the invention.

As shown, the cylindrical body 22 of the piston valve is extended toward the left and is internally screw threaded throughout its length. This body extends therefore over a distance slightly greater than twice the thickness of the closure piston 28 and the body has no lateral or other outlet boss.

The body of the closure piston 28 has at least two axial openings which extend throughout the length of the closure piston on each side of a central cavity 29 having a polygonal cross-sectional shape.

Screwed into the open end of the body 22 is an externally screwthreaded boss 30 of a device for actuating the valve, this boss being in one piece with a hollow body 31 having an axial central bore in which is rotatably and slidably mounted an element generally designated by the reference numeral 32.

The bore of the body 31 comprises a first chamber 33 which opens out at the end of the body opposed to the boss 30, this chamber 33 being followed by a portion 34 of reduced diameter which is followed by a portion 35 of slightly larger diameter which opens out at the end of the boss 30.

The rotatable and slidable element 32 comprises a piston 36 rotatably and slidably mounted in a fluidtight manner in the chamber 33 and rigid with a central axial rod having a portion 37 which extends with a fluidtight contact through the portion 34 of the bore and is extended through the boss 30. The portion 35 of the bore having a diameter larger than that of the rod 37 defines around the latter a cylindrical chamber. The rod rigid with the piston 36 has a second portion 38 which extends in the opposite direction through a central opening of a cover 39 which closes the open end of the chamber 33 of the body 31 and in which the portion 38 of the rod is rotatable and slidable.

The end of the portion 37 of the rod has a polygonal cross-sectional shape complementary to that of the cavity 29 in the piston of the valve.

The travel of the piston 36 in the chamber 33 and the length of the portion 37 of the rod are so determined that, when the piston 36 bears against the end of the chamber 33 remote from the cover 39, the end of the rod 37 extends into the cavity 29 of the closure piston 28.

The body 31 of the actuating device includes a system of conduits the first of which is formed by the axial annular passage defined by the portin 35 of the bore surrounding the rod 37. The first axial conduit is connected to a radial conduit 40 which opens laterally onto the outside of the body 31 and is itself connected to a second axial conduit 41 which opens onto the chamber 33 on the side of the piston 36 remote from the boss 30.

Figure 4:
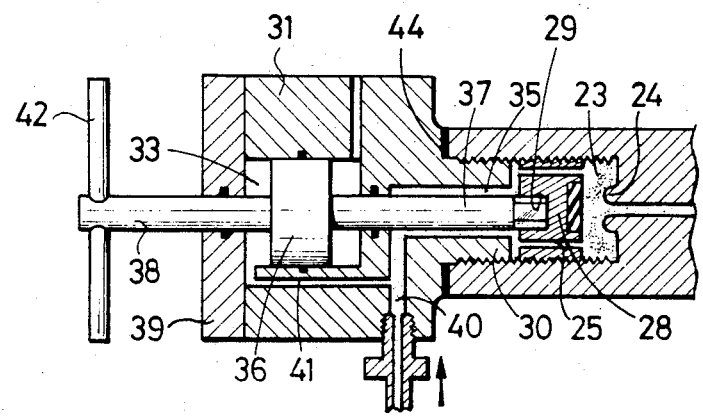
FIG. 4 is a view similar to FIG. 2 of the unit according to the invention in the opening position for filling or emptying the tank.

With reference to FIG. 4 in which the closure piston 28 of the valve is shown in the position spaced away from the seat 24, it will be understood that the fluid under pressure contained in the tank immediately fills the chamber 23 and flows through the openings 25 to the other side of this piston into the space remaining between the latter and the end of the boss 30 and then into the first axial conduit 35 surrounding the rod 37 and into the radial conduit 40 and finally through the second axial conduit 41 into the chamber 33 and thus establishes on the side of the piston 36 a pressure which tends to urge the piston 36 and thus forces the end of the rod 37 into the cavity 29 of the piston 28. This facilitates the actuation of the unit by forcefully maintaining the end of the rod 37 in the cavity of the piston of the valve, the part of the chamber 33 located on the other side of the piston 36 being connected to the atmosphere and thereby allowing the free sliding of the piston 36. The free end of the rod 38 has an actuating element which may be a simple handle 42 or a wheel or the like. It will be understood that, when the handle 42 is shifted in order to rotate the rotatable and slidable element so as to screw or unscrew the piston 28 of the valve, the piston 36 slides while rotating in the chamber 33 in one direction or the other depending on the direction of rotation of the element 32.

It will be understood that the operation is identical when it concerns a filling of the tank with a fluid under pressure introduced through the radial conduit 40. In this case, the pressure of the fluid acts on the side of the piston in the chamber 33 through the second axial conduit 41 and urges the rod 37 into the cavity 29 of the piston of the valve.

Figure 5:
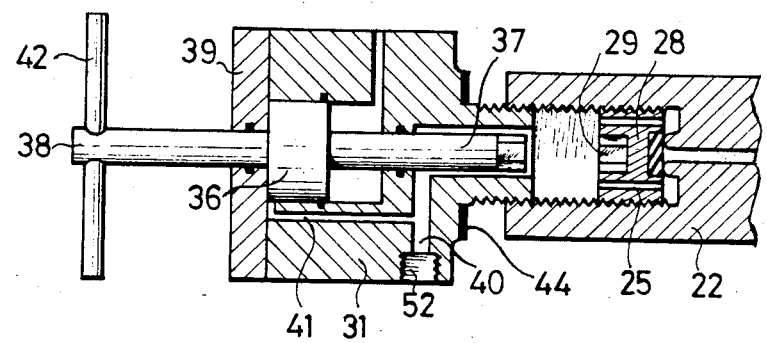
FIG. 5 is a view similar to FIG. 4 of the piston valve in the closed position and of the actuating device in process of being removed.
Figure 6:
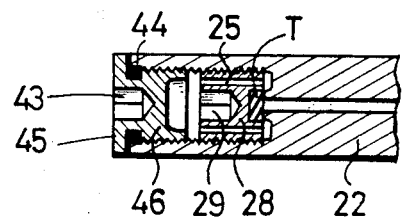
FIG. 6 is a longitudinal sectional view of the piston valve according to the invention provided with an additional sealing plug.

When it is desired to remove the actuating device from the valve when the latter is closed, it is sufficient to pull the handle 42 outwardly to expel the fluid which may remain in the chamber 33 and which escapes through the radial conduit 40, the end of the rod 37 being thereby removed from the cavity of the piston of the valve. The body 31 of the device can then be unscrewed from the body 22 of the valve without driving the piston of the latter in rotation (FIG. 5). When the tank is full and the valve closed, there is screwed into the open end of the body 22 a safety externally screw-threaded plug which defines, as shown in FIG. 6, a cavity 43 of polygonal cross-sectional shape corresponding to that of the cavity 29, a sealing element 44 being disposed between the end of the body 22 of the valve and a radial shoulder 45 on the plug 46. The latter may be placed in position by using the end of the rod 37 of the actuating device which is removed from the valve.

Figure 3:
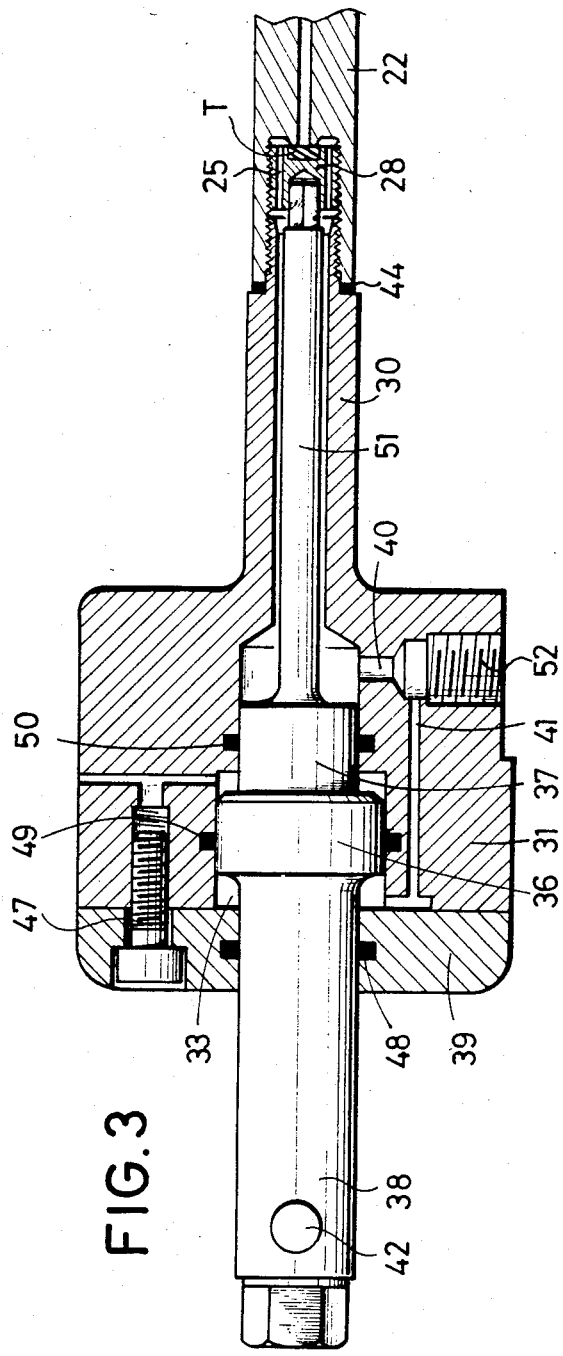
FIG. 3 is a side elevational and sectional view of a preferred embodiment of the device according to the invention mounted on a piston valve.

With reference to FIG. 3, there has been shown in more detail a preferred embodiment of the invention in which the cover 39 of the body 31 is secured to the latter by screws 47 and sealing elements 48, 49 and 50 are suitably disposed within the thickness of the cover 39 around the rod 38, in a groove formed in the wall of the chamber 33 and around a portion of the rod 37 which has in this embodiment a portion 51 of reduced diameter, the radial conduit 40 communicating with a tapped counterbore 52 in which a body of a filling device may be introduced. The outer end of the rod 38 may have a portion having a polygonal cross-sectional shape and adapted to be driven in rotation by a key.

It will be understood that the closing and filling unit according to the invention for a tank containing a fluid under pressure permits an easy actuation and a closure having two sealing stages of the piston valve which is simple in construction and highly reliable.

What is claimed is:

1. A closing and filling unit for a tank containing a fluid under pressure, said unit comprising in combination: a piston valve having a body and a closure piston in said body and provided with axial openings, and a device for actuating said valve comprising a rotatable and slidable element and means for utilizing the pressure of said fluid when filling and emptying the tank so as to urge said element into engagement with the closure piston, said device being detachably fixed to the body of the valve.

2. A unit according to claim 1, wherein the body of the valve has an internal screw thread, the closure piston has an external screw thread cooperative with the internal screw thread on the body of the valve and a cavity for cooperation with a key, the body of the valve being a cylinder having a solid wall, the actuating device comprising a body having at one end a screw-threaded boss cooperative with said internal screw thread of the body of the valve.

3. A unit according to claim 2, wherein the body of the actuating device includes an axial bore entending therethrough and opening to the exterior through said screw-threaded boss, said bore being enlarged at an end of the body of the device opposed to said boss so as to define a cylindrical chamber, the unit further comprising a cover which closes the chamber and defines an opening in axial alignment with the bore, said rotatable and slidable element being disposed in fluidtight contact with said chamber and with said bore in a part of the length of said bore.

4. A unit according to claim 3, wherein the rotatable and slidable element includes a piston disposed in said chamber and a rod which is rigid with the piston of said element and extends on each side of said piston of said element, one end of said rod extending through the bore and the boss and being cooperative with the cavity in the closure piston, while an opposite end portion of said rod extends out of the body of the device through the cover and carries driving means.

5. A unit according to claim 4, wherein the travel of said piston of said element and the length of the rod are so determined that the end of the rod which is cooperative with the cavity of the closure piston is retracted within the bore when the piston of said element is in the vicinity of an end of its travel adjacent to the cover closing the chamber.

6. A unit according to claim 5, wherein said means for utilizing the pressure of the fluid when filling and emptying the tank for urging said element into engagement with the cavity of the closure piston comprise in the body of the actuating device a filling and emptying orifice in a lateral wall of the body of the device, a system of conduits connecting an end of the screw-threaded boss to said orifice and to said chamber between the piston of said element and the cover, and means connecting an opposite side of the piston of said element to the atmosphere.

7. A unit according to claim 6, wherein said system of conduits comprises a first radial conduit connected to said orifice and a first axial conduit connected through one end thereof to said radial conduit and through an opposite end thereof to said chamber between the piston of said element and the cover, and a second axial conduit connecting the end of the boss to said first radial conduit.

8. A unit according to claim 7, wherein said second axial conduit is formed by an enlargement of a portion of the bore in which said rod of said element extends between the piston of said element in the chamber and the end cooperative with the piston of the valve.

9. A unit according to claim 6, wherein said orifice includes a screw-threaded connector system for the filling and emptying of the tank.

* * * * *